US012353177B1

(12) United States Patent
Chen et al.

(10) Patent No.: US 12,353,177 B1
(45) Date of Patent: Jul. 8, 2025

(54) ENERGY-SAVING CONTROL SYSTEM AND METHOD FOR BOILER IN THERMAL POWER PLANT

(71) Applicant: HUANENG CHAOHU POWER GENERATION CO., LTD., Hefei (CN)

(72) Inventors: Shengjiang Chen, Hefei (CN); Yiru Wang, Hefei (CN); Jiajia Ma, Hefei (CN); Yuanshuang Geng, Hefei (CN); Jue Wang, Hefei (CN); Xuemin Zhang, Hefei (CN); Xin Dai, Hefei (CN); Yu Bai, Hefei (CN)

(73) Assignee: HUANENG CHAOHU POWER GENERATION CO., LTD., Anhui (CN)

( * ) Notice: Subject to any disclaimer, the term of this patent is extended or adjusted under 35 U.S.C. 154(b) by 0 days.

(21) Appl. No.: 19/194,039

(22) Filed: Apr. 30, 2025

(30) Foreign Application Priority Data

Jul. 23, 2024 (CN) .......................... 202410993334.7

(51) Int. Cl.
G05B 13/04 (2006.01)
G05B 19/418 (2006.01)
(52) U.S. Cl.
CPC ......... G05B 13/048 (2013.01); G05B 19/418 (2013.01); G05B 2219/32021 (2013.01)
(58) Field of Classification Search
None
See application file for complete search history.

(56) References Cited

U.S. PATENT DOCUMENTS

2006/0047366 A1* 3/2006 Boyden ................ G05B 13/027
700/266
2011/0106506 A1* 5/2011 Headley ................. F23N 5/006
703/2

FOREIGN PATENT DOCUMENTS

CN 101561148 A 10/2009
CN 106500128 A 3/2017
(Continued)

OTHER PUBLICATIONS

Zhaoping Hao, "Study on Soft-Sensing Theory of NO Content in the Inlet of SCR Reactor", Journal, Full-text Database of Excellent Master's Theses in China (Engineering and Technology I), Issue 03 in 2018, pp. 1-47, Mar. 15, 2018, China.

Primary Examiner — Ryan A Jarrett
(74) Attorney, Agent, or Firm — Ming Jiang; OPENPTO US LLC

(57) ABSTRACT

The disclosure provides an energy-saving control system and method for a boiler in a thermal power plant. The system includes: a prediction module, used for predicting current boiler operating efficiency; an optimization module, used for optimizing boiler input parameters based on a particle swarm algorithm, determining an optimal operating condition parameter combination, and setting adjustment steps of the optimal operating condition parameter combination; an emission detection module, used for obtaining NOx emission data of the boiler in thermal power plant and calculating a NOx emission fluctuation degree according to the NOx emission data; a parameter correction module, used for setting emission weight according to the fluctuation degree and setting a correction value of the optimal operating condition parameter combination according to the emission weight; a regulating and controlling module, used for regulating and controlling the boiler of the thermal power plant.

7 Claims, 2 Drawing Sheets

(56) References Cited

FOREIGN PATENT DOCUMENTS

| | | | |
|---|---|---|---|
| CN | 108038306 | A | 5/2018 |
| CN | 110486749 | A | 11/2019 |
| CN | 117434837 | A | 1/2024 |
| WO | 2022045526 | A1 | 3/2022 |
| WO | 2023241406 | A1 | 12/2023 |

* cited by examiner

ENERGY-SAVING CONTROL SYSTEM AND METHOD FOR BOILER IN THERMAL POWER PLANT

CROSS-REFERENCE TO RELATED APPLICATIONS

This application claims priority of Chinese Patent Application No. 202410993334.7, filed on Jul. 23, 2024, the content of which is hereby incorporated by reference.

TECHNICAL FIELD

The disclosure relates to the technical field of boiler energy saving, and more specifically relates to an energy-saving control system and method for a boiler in a thermal power plant.

BACKGROUND

The boiler in thermal power plant is a medium-sized and large boiler that provides steam with specified quantity and quality to the steam turbine in the power plant, and it is one of the main thermal equipment in thermal power plant. It is often matched with a certain capacity steam turbine generator set, which is mainly used for power generation, but it can also be used as external heating in some special occasions. Generally, its evaporation capacity is large, and its steam parameters (steam temperature and steam pressure) are very high. It is necessary to have a complete set of auxiliary equipment, with room-burning furnace, forced ventilation, and multiple combustible fuels (pulverized coal, crude oil or heavy oil, blast furnace gas or coke oven gas). The structure is complex and the efficiency is high, most of which can reach about 85%-93%, and there are high requirements for operation management level, mechanization degree and automatic control technology.

The boiler energy-saving standard refers to a series of standard requirements for the purpose of saving energy, reducing emissions, improving performance, etc., by standardizing the energy consumption and thermal efficiency of boilers in various stages such as design, manufacturing, installation, and use according to various factors such as energy utilization efficiency, thermal efficiency and environmental protection requirements. However, there is a contradictory relationship between boiler efficiency and NOx emission. How to adjust the contradictory relationship between boiler efficiency and NOx emission to achieve the most efficient and energy-saving effect of boiler is a technical problem to be solved urgently in this field.

SUMMARY

The disclosure provides an energy-saving control system and method for a boiler in a thermal power plant, which are used to solve the problems of low combustion efficiency of boilers and inability to effectively control NOx emission in the prior art. The system includes:

a prediction module, used for obtaining operating condition parameters of a boiler in a thermal power plant and predicting current boiler operating efficiency according to the operating condition parameters of the boiler in the thermal power plant;

an optimization module, used for optimizing boiler input parameters based on a particle swarm algorithm, determining an optimal operating condition parameter combination according to optimization results, and setting adjustment steps of the optimal operating condition parameter combination according to operating efficiency predicted values;

an emission detection module, used for obtaining NOx emission data of the boiler in thermal power plant and calculating a NOx emission fluctuation degree according to the NOx emission data;

a parameter correction module, used for setting emission weight according to the fluctuation degree and setting a correction value of the optimal operating condition parameter combination according to the emission weight;

a regulating and controlling module, used for regulating and controlling the boiler of the thermal power plant according to the correction value of the optimal operating condition parameter combination.

Further, the prediction module is further used for:

obtaining historical operating condition parameters of the boiler in the thermal power plant and boiler operating efficiency, and preprocessing the historical operating condition parameters and the boiler operating efficiency;

training preprocessed historical operating condition parameters and boiler operating efficiency data, to generate a boiler operating efficiency prediction model;

obtaining real-time detection values of the operating condition parameters of the boiler in thermal power plant, and predicting boiler operating efficiency under a current operating condition based on the boiler operating efficiency prediction model.

Further, the optimization module is further used for:

initializing particle swarm parameters, setting the boiler operating efficiency as a fitness function, calculating fitness values of particles, and determining a local optimal value and a global optimal value;

drawing a fitness value change curve of particles according to a change trend of the fitness values with iteration times, and calculating a slope average value of the fitness values in a preset iteration times interval according to the fitness value change curve of particles;

updating inertia weight of particles according to the slope average value of the fitness values in the preset iteration times interval, and updating particles according to an updated value of the inertia weight;

judging whether current iteration times meet termination conditions of the algorithm, if so, outputting an operating condition parameter combination of an optimal fitness function according to the global optimal value; if not, continuing iteration.

Further, the optimization module is further used for:

updating the inertia weight of particles according to an inertia weight updating formula, where the inertia weight updating formula specifically is:

$$w=(w_{max}-w_{min})\exp(k-k_a)-w_{min}$$

where, w is the inertia weight, $w_{min}$ is an inertia weight minimum value, $w_{max}$ is an inertia weight maximum value, k is a slope average value of fitness values within the preset iteration times interval, and $k_a$ is a preset standard slope average value.

Further, the optimization module is further used for:

inputting an operating condition parameter combination of optimal boiler efficiency into the boiler operating efficiency prediction model, and determining the optimal boiler operating efficiency according to the boiler operating efficiency prediction model;

calculating a ratio between the current boiler operating efficiency and the optimal boiler operating efficiency, and calculating a difference value between an operating efficiency ratio and a preset allowable ratio;

if the difference value between the operating efficiency ratio and the preset allowable ratio is less than a first preset threshold, determining a first preset adjustment step size as an adjustment step size of the optimal operating condition parameter combination;

if the difference value between the operating efficiency ratio and the preset allowable ratio is greater than or equal to the first preset threshold, determining a second preset adjustment step size as an adjustment step size of the optimal operating condition parameter combination;

if the difference value between the operating efficiency ratio and the preset allowable ratio is greater than a second preset threshold, determining a third preset adjustment step size as an adjustment step size of the optimal operating condition parameter combination.

Further, the emission detection module is further used for:

determining NOx emission concentration according to the NOx emission data of the boiler in thermal power plant, and drawing a NOx emission concentration change curve according to a change trend of the NOx emission concentration with time;

creating a plurality of rolling time windows, setting window sizes of the rolling time windows according to a curve length of the NOx emission concentration change curve, and segmenting the NOx emission concentration change curve according to the rolling time windows;

calculating NOx emission concentration average values in segmented rolling time windows, and drawing a NOx emission concentration average value change curve according to NOx emission concentration average values in each of the rolling time windows;

calculating a slope absolute value of two adjacent points in the NOx emission concentration average value change curve, and screening out data of slope absolute value with exceeding a first preset threshold; setting a proportion of a number of data of slope absolute value with exceeding a first preset threshold in the NOx emission concentration average value change curve as the NOx emission fluctuation degree.

Further, the parameter correction module is further used for:

calculating a ratio of the NOx emission fluctuation degree to a preset allowable fluctuation degree, and normalizing the ratio of the NOx emission fluctuation degree to the preset allowable fluctuation degree;

setting a normalized ratio of the NOx emission fluctuation degree to the preset allowable fluctuation degree as an emission weight, and multiplying the emission weight with a preset standard correction value to obtain the correction value of the optimal operating condition parameter combination.

Further, the parameter correction module is further used for:

obtaining operating condition parameter in a preset period according to boiler historical operating data, and calculating a correlation coefficient between each of the operating condition parameters and the NOx emission concentration according to the operating condition parameters in the preset period;

taking the correlation coefficient between each of the operating condition parameters and the NOx emission concentration as an adjustment coefficient of each of the operating condition parameters, and adjusting a correction value of each of the operating condition parameters in the optimal operating condition parameter combination according to the adjustment coefficient of each of the operating condition parameters.

Further, the regulating and controlling module is further used for:

multiplying the correction value of the optimal operating condition parameter combination with each of parameters in the optimal operating condition parameter combination to obtain final operating condition parameters;

setting the adjustment step size of the optimal operating condition parameter combination as a current adjustment step size, and taking the final operating condition parameters as target values to adjust the current operating condition parameters of the boiler.

In order to achieve the above purpose, the disclosure also provides an energy-saving control method for a boiler in a thermal power plant, including:

obtaining operating condition parameters of a boiler in a thermal power plant and predicting current boiler operating efficiency according to the operating condition parameters of the boiler in the thermal power plant;

optimizing boiler input parameters based on a particle swarm algorithm, determining an optimal operating condition parameter combination according to optimization results, and setting adjustment steps of the optimal operating condition parameter combination according to operating efficiency predicted values;

obtaining NOx emission data of the boiler in thermal power plant and calculating a NOx emission fluctuation degree according to the NOx emission data;

setting an emission weight according to the fluctuation degree and setting a correction value of the optimal operating condition parameter combination according to the emission weight;

regulating and controlling the boiler of the thermal power plant according to the correction value of the optimal operating condition parameter combination.

The disclosure has the following beneficial effects.

By applying the above technical scheme, the disclosure optimizes the input parameters of the boiler of the thermal power plant based on the particle swarm algorithm, and converges the algorithm in time according to the changing trend of the fitness value, so that the optimal operating condition parameter combination can be found conveniently and quickly, and the operating efficiency of the boiler is greatly improved. At the same time, combined with the prediction model, the adjustment step of the boiler is set, and the parameters are adjusted stably. By adjusting the parameters in the optimal operating condition parameter combination through the NOx emission data, the NOx emission can be effectively controlled, and the boiler can run efficiently, save energy and protect the environment.

BRIEF DESCRIPTION OF THE DRAWINGS

In order to explain the technical scheme in the embodiment of the disclosure more clearly, the drawings needed in the description of the embodiment will be briefly introduced below. Obviously, the drawings in the following description are only some embodiments of the disclosure. For those skilled in the art, other drawings can be obtained according to these drawings without creative efforts.

DETAILED DESCRIPTION OF THE EMBODIMENTS

In the following, the technical scheme in the embodiment of the disclosure will be clearly and completely described with reference to the drawings in the embodiment of the disclosure. Obviously, the described embodiment is only a part of the embodiment of the disclosure, but not all of the embodiments. Based on the embodiments in the disclosure, all other embodiments obtained by ordinary skilled in this field without creative efforts belong to the protection scope of the disclosure.

Figure 1:
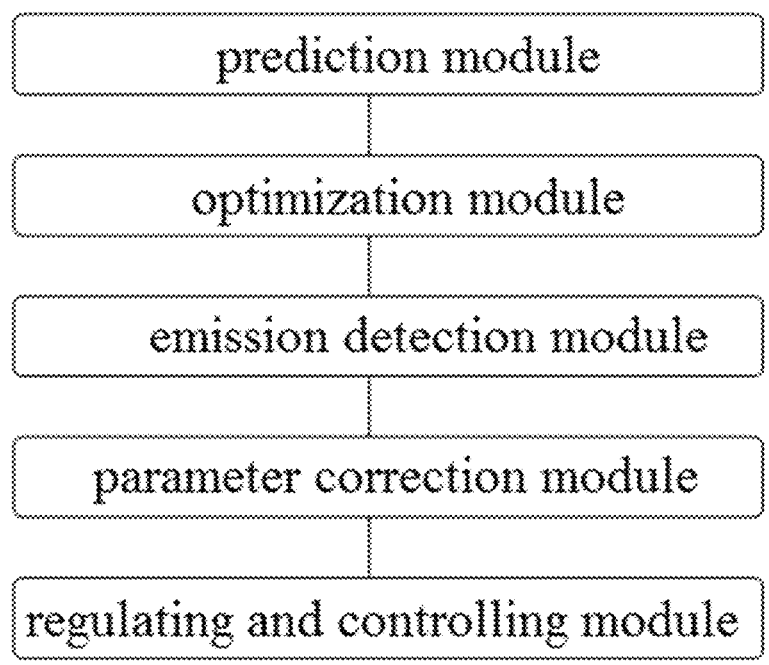
FIG. 1 shows a structural schematic diagram of an energy-saving control system for a boiler in a thermal power plant according to embodiments of the disclosure.

An embodiment of the disclosure provides an energy-saving control system for a boiler in a thermal power plant, as shown in FIG. 1, including:

a prediction module, used for obtaining operating condition parameters of a boiler in a thermal power plant and predicting current boiler operating efficiency according to the operating condition parameters of the boiler in the thermal power plant; an optimization module, used for optimizing boiler input parameters based on a particle swarm algorithm, determining an optimal operating condition parameter combination according to optimization results, and setting adjustment steps of the optimal operating condition parameter combination according to operating efficiency predicted values; an emission detection module, used for obtaining NOx emission data of the boiler in thermal power plant and calculating a NOx emission fluctuation degree according to the NOx emission data; a parameter correction module, used for setting emission weight according to the fluctuation degree and setting a correction value of the optimal operating condition parameter combination according to the emission weight; a regulating and controlling module, used for regulating and controlling the boiler of the thermal power plant according to the correction value of the optimal operating condition parameter combination.

In this embodiment, the operating condition parameters of the boiler in the thermal power plant specifically include primary air, secondary air distribution modes, burnt-out air volume and oxygen volume. The NOx emission data of the boiler in the thermal power plant are monitored in real time by setting up an online monitoring system for nitrogen oxides.

In some embodiments of the disclosure, the prediction module is further used for: obtaining historical operating condition parameters of the boiler in the thermal power plant and boiler operating efficiency, and preprocessing the historical operating condition parameters and the boiler operating efficiency; training preprocessed historical operating condition parameters and boiler operating efficiency data, to generate a boiler operating efficiency prediction model; obtaining real-time detection values of the operating condition parameters of the boiler in thermal power plant, and predicting boiler operating efficiency under a current operating condition based on the boiler operating efficiency prediction model.

In this embodiment, the prediction module can build a boiler operating efficiency prediction model based on one or more of convolution neural network, deep neural network, genetic algorithm and other algorithms, and obtain a model training sample set and a test sample set by preprocessing the historical operating condition parameters and the corresponding boiler operation efficiency, such as denoising, redundancy removal and normalization.

In some embodiments of the disclosure, the optimization module is further used for: initializing particle swarm parameters, setting the boiler operating efficiency as a fitness function, calculating fitness values of particles, and determining a local optimal value and a global optimal value; drawing a fitness value change curve of particles according to a change trend of the fitness values with iteration times, and calculating a slope average value of the fitness values in a preset iteration times interval according to the fitness value change curve of particles; updating inertia weight of particles according to the slope average value of the fitness values in the preset iteration times interval, and updating particles according to an updated value of the inertia weight; judging whether current iteration times meet termination conditions of the algorithm, if so, outputting an operating condition parameter combination of an optimal fitness function according to the global optimal value; if not, continuing iteration.

In this embodiment, the slope average value of fitness value within the preset iteration times interval is specifically the slope average value of fitness value at both ends of the preset iteration times interval, and the size of the slope average value can reflect the growth or decline speed of fitness value.

In some embodiments of the disclosure, the optimization module is further used for: updating the inertia weight of particles according to an inertia weight updating formula, where the inertia weight updating formula specifically is:

$$w=(w_{max}-w_{min})\exp(k-k_a)-w_{min};$$

where, w is the inertia weight, $w_{min}$ is an inertia weight minimum value, $w_{max}$ is an inertia weight maximum value, k is a slope average value of fitness values within the preset iteration times interval, and $k_a$ is a preset standard slope average value.

In this embodiment, $w_{min}$ takes 0.2 and $w_{max}$ 0.7, $k_a$ is set according to the operation experience of the unit. The faster the fitness value changes, the greater the value of inertia weight, which can improve the global search ability of the algorithm. The slower the fitness value changes, it shows that the boiler operating conditions parameters are close to the optimal operating efficiency, so the value of inertia weight is smaller, which can improve the local search ability of the algorithm, accelerate the convergence speed and improve the calculation efficiency.

In some embodiments of the disclosure, the optimization module is further used for: inputting an operating condition parameter combination of optimal boiler efficiency into the boiler operating efficiency prediction model, and determining the optimal boiler operating efficiency according to the boiler operating efficiency prediction model; calculating a ratio between the current boiler operating efficiency and the optimal boiler operating efficiency, and calculating a difference value between an operating efficiency ratio and a preset allowable ratio; if the difference value between the operating efficiency ratio and the preset allowable ratio is less than a first preset threshold, determining a first preset adjustment step size as an adjustment step size of the optimal operating condition parameter combination; if the difference value between the operating efficiency ratio and the preset allowable ratio is greater than or equal to the first preset threshold, determining a second preset adjustment step size as an adjustment step size of the optimal operating condition parameter combination; if the difference value between the operating efficiency ratio and the preset allowable ratio is greater than a second preset threshold, determining a third preset adjustment step size as an adjustment step size of the optimal operating condition parameter combination.

In this embodiment, the first preset adjustment step, the second preset adjustment step and the third preset adjustment step become larger in turn, and the greater the difference value between the optimal boiler operation efficiency and the current boiler operation efficiency, the longer the corresponding set adjustment step, the stronger the stability when the boiler is adjusted, so as to prevent the boiler from being abnormal due to too fast adjustment speed.

In some embodiments of the disclosure, the emission detection module is further used for: determining NOx emission concentration according to the NOx emission data of the boiler in thermal power plant, and drawing a NOx emission concentration change curve according to a change trend of the NOx emission concentration with time; creating a plurality of rolling time windows, setting window sizes of the rolling time windows according to a curve length of the NOx emission concentration change curve, and segmenting the NOx emission concentration change curve according to the rolling time windows; calculating NOx emission concentration average values in segmented rolling time windows, and drawing a NOx emission concentration average value change curve according to NOx emission concentration average values in each of the rolling time windows; calculating a slope absolute value of two adjacent points in the NOx emission concentration average value change curve, and screening out data of slope absolute value with exceeding a first preset threshold; setting a proportion of a number of data of slope absolute value with exceeding a first preset threshold in the NOx emission concentration average value change curve as the NOx emission fluctuation degree.

In this embodiment, the change speed of NOx emission concentration in the rolling window is determined by the slope of the average value change curve of NOx emission concentration, and the higher the change speed, the higher the fluctuation degree of NOx emission concentration, and the fluctuation degree of overall NOx emission is determined by calculating the proportion of the number of data of slope absolute value with exceeding a first preset threshold in the NOx emission concentration average value change curve.

In some embodiments of the disclosure, the parameter correction module is further used for: calculating a ratio of the NOx emission fluctuation degree to a preset allowable fluctuation degree, and normalizing the ratio of the NOx emission fluctuation degree to the preset allowable fluctuation degree; setting a normalized ratio of the NOx emission fluctuation degree to the preset allowable fluctuation degree as an emission weight, and multiplying the emission weight with a preset standard correction value to obtain the correction value of the optimal operating condition parameter combination.

In this embodiment, the normalization processing formula is specifically:

$$N_i = \frac{N - N_{min}}{N_{max} - N_{min}};$$

where $N_i$ is the NOx emission fluctuation degree after normalization, N is the current NOx emission fluctuation degree, $N_{max}$ is the NOx emission fluctuation degree maximum value, and $N_{min}$ is the NOx emission fluctuation degree minimum value.

In some embodiments of the disclosure, the parameter correction module is further used for: obtaining operating condition parameter in a preset period according to boiler historical operating data, and calculating a correlation coefficient between each of the operating condition parameters and the NOx emission concentration according to the operating condition parameters in the preset period; taking the correlation coefficient between each of the operating condition parameters and the NOx emission concentration as an adjustment coefficient of each of the operating condition parameters, and adjusting a correction value of each of the operating condition parameters in the optimal operating condition parameter combination according to the adjustment coefficient of each of the operating condition parameters.

In this embodiment, the change relationship between the operating condition parameter change and NOx emission concentration is obtained according to the boiler historical operating data. Because there are multiple operating condition parameters in the optimal operating condition parameter combination, the influence efficiency of each parameter on NOx emission concentration is different, so each operating condition parameter is adjusted one by one by calculating the correlation coefficient between operating condition parameters and NOx emission concentration. The calculation formula of the correlation coefficient between operating condition parameters and NOx emission concentration is as follows:

$$r = \frac{\sum (x_i - \bar{x})(y_i - \bar{y})}{\sqrt{\sum (x_i - \bar{x})^2 (y_i - \bar{y})^2}};$$

where r is the correlation coefficient, $x_i$ is the i-th operating condition parameter, $\bar{x}$ is the average value of operating condition parameters, $y_i$ is the i-th NOx emission concentration, and $\bar{y}$ is the NOx emission concentration average value.

In some embodiments of the disclosure, the regulating and controlling module is further used for: multiplying the correction value of the optimal operating condition parameter combination with each of parameters in the optimal operating condition parameter combination to obtain final operating condition parameters; setting the adjustment step size of the optimal operating condition parameter combination as a current adjustment step size, and taking the final operating condition parameters as target values to adjust the current operating condition parameters of the boiler.

In this embodiment, each operating condition parameter is corrected by the correction value of the optimal operating condition parameter combination to obtain the final operating condition parameter, and the boiler is adjusted by adjusting the step size.

Figure 2:
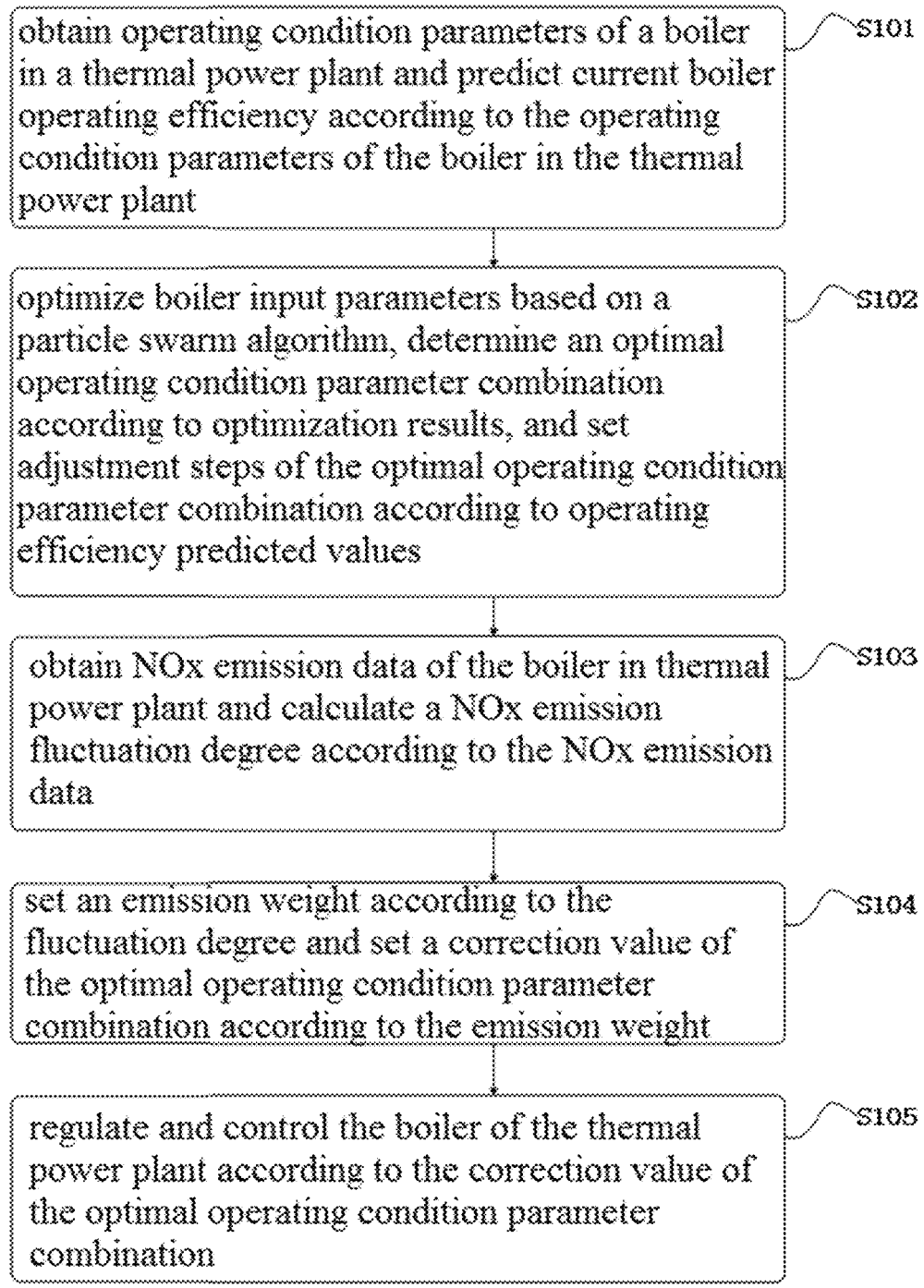
FIG. 2 shows an overall flow chart of an energy-saving control method for a boiler in a thermal power plant according to embodiments of the disclosure.

Based on the same technical concept, as shown in FIG. 2, the disclosure also provides an energy-saving control method for a boiler in a thermal power plant, including:

S101, operating condition parameters of a boiler in a thermal power plant are obtained and current boiler operating efficiency is predicted according to the operating condition parameters of the boiler in the thermal power plant;

S102, boiler input parameters are optimized based on a particle swarm algorithm, an optimal operating condition parameter combination is determined according to optimization results, and adjustment steps of the optimal operating condition parameter combination are set according to operating efficiency predicted values;

S103, NOx emission data of the boiler in thermal power plant is obtained and a NOx emission fluctuation degree is calculated according to the NOx emission data;

S104, an emission weight is set according to the fluctuation degree and a correction value of the optimal operating condition parameter combination is set according to the emission weight;

S105, the boiler of the thermal power plant is regulated and controlled according to the correction value of the optimal operating condition parameter combination.

By applying the above technical scheme, in the disclosure, operating condition parameters of a boiler in a thermal power plant are obtained and current boiler operating efficiency is predicted according to the operating condition parameters of the boiler in the thermal power plant; boiler input parameters are optimized based on a particle swarm algorithm, an optimal operating condition parameter combination is determined according to optimization results, and adjustment steps of the optimal operating condition parameter combination are set according to operating efficiency predicted values; NOx emission data of the boiler in thermal power plant is obtained and a NOx emission fluctuation degree is calculated according to the NOx emission data; an emission weight is set according to the fluctuation degree and a correction value of the optimal operating condition parameter combination is set according to the emission weight; the boiler of the thermal power plant is regulated and controlled according to the correction value of the optimal operating condition parameter combination. The operation efficiency of the boiler in the thermal power plant is greatly improved, which is energy-saving and environment-friendly.

From the description of the above embodiments, those skilled in the art can clearly understand that the disclosure can be realized by hardware, or by means of software and necessary general hardware platform. Based on this understanding, the technical scheme of the disclosure can be embodied in the form of a software product, which can be stored in a non-volatile storage medium (such as CD-ROM, USB flash drive, mobile hard disk, etc.) and several instructions are included to make a computer device (such as a personal computer, a server, or a network device, etc.) perform the methods described in various embodiments of the disclosure.

Finally, it should be explained that the above embodiments are only used to illustrate the technical scheme of the disclosure, but not to limit it. Although the disclosure has been described in detail with reference to the foregoing embodiments, it should be understood by those skilled in the art that the technical solutions described in the foregoing embodiments can still be modified or some technical features thereof can be replaced by equivalents. However, these modifications or substitutions do not drive the essence of the corresponding technical solutions away from the spirit and scope of the technical solutions of various embodiments of the disclosure.

What is claimed is:

1. An energy-saving control system for a boiler in a thermal power plant, comprising:
    a prediction module, used for obtaining operating condition parameters of a boiler in a thermal power plant and predicting current boiler operating efficiency according to the operating condition parameters of the boiler in the thermal power plant;
    an optimization module, used for optimizing boiler input parameters based on a particle swarm algorithm, determining an optimal operating condition parameter combination according to optimization results, and setting adjustment steps of the optimal operating condition parameter combination according to operating efficiency predicted values;
    an emission detection module, used for obtaining NOx emission data of the boiler in thermal power plant and calculating a NOx emission fluctuation degree according to the NOx emission data;
    a parameter correction module, used for setting emission weight according to the fluctuation degree and setting a correction value of the optimal operating condition parameter combination according to the emission weight;
    a regulating and controlling module, used for regulating and controlling the boiler of the thermal power plant according to the correction value of the optimal operating condition parameter combination;
    wherein the emission detection module is further used for:
    determining NOx emission concentration according to the NOx emission data of the boiler in thermal power plant, and drawing a NOx emission concentration change curve according to a change trend of the NOx emission concentration with time;
    creating a plurality of rolling time windows, setting window sizes of the rolling time windows according to a curve length of the NOx emission concentration change curve, and segmenting the NOx emission concentration change curve according to the rolling time windows;
    calculating NOx emission concentration average values in segmented rolling time windows, and drawing a NOx emission concentration average value change curve according to NOx emission concentration average values in each of the rolling time windows;
    calculating a slope absolute value of two adjacent points in the NOx emission concentration average value change curve, and screening out data of slope absolute value with exceeding a first preset threshold; setting a proportion of a number of data of slope absolute value with exceeding a first preset threshold in the NOx emission concentration average value change curve as the NOx emission fluctuation degree;
    wherein the parameter correction module is further used for:
    calculating a ratio of the NOx emission fluctuation degree to a preset allowable fluctuation degree, and normalizing the ratio of the NOx emission fluctuation degree to the preset allowable fluctuation degree;
    setting a normalized ratio of the NOx emission fluctuation degree to the preset allowable fluctuation degree as an emission weight, and multiplying the emission weight with a preset standard correction value to obtain the correction value of the optimal operating condition parameter combination;

wherein the parameter correction module is further used for:
obtaining operating condition parameter in a preset period according to boiler historical operating data, and calculating a correlation coefficient between each of the operating condition parameters and the NOx emission concentration according to the operating condition parameters in the preset period;
taking the correlation coefficient between each of the operating condition parameters and the NOx emission concentration as an adjustment coefficient of each of the operating condition parameters, and adjusting a correction value of each of the operating condition parameters in the optimal operating condition parameter combination according to the adjustment coefficient of each of the operating condition parameters.

2. The energy-saving control system for a boiler in a thermal power plant according to claim 1, wherein the prediction module is further used for:
obtaining historical operating condition parameters of the boiler in the thermal power plant and boiler operating efficiency, and preprocessing the historical operating condition parameters and the boiler operating efficiency;
training preprocessed historical operating condition parameters and boiler operating efficiency data, to generate a boiler operating efficiency prediction model;
obtaining real-time detection values of the operating condition parameters of the boiler in thermal power plant, and predicting boiler operating efficiency under a current operating condition based on the boiler operating efficiency prediction model.

3. The energy-saving control system for a boiler in a thermal power plant according to claim 1, wherein the optimization module is further used for:
initializing particle swarm parameters, setting the boiler operating efficiency as a fitness function, calculating fitness values of particles, and determining a local optimal value and a global optimal value;
drawing a fitness value change curve of particles according to a change trend of the fitness values with iteration times, and calculating a slope average value of the fitness values in a preset iteration times interval according to the fitness value change curve of particles;
updating inertia weight of particles according to the slope average value of the fitness values in the preset iteration times interval, and updating particles according to an updated value of the inertia weight;
judging whether current iteration times meet termination conditions of the algorithm, if so, outputting an operating condition parameter combination of an optimal fitness function according to the global optimal value; if not, continuing iteration.

4. The energy-saving control system for a boiler in a thermal power plant according to claim 3, wherein the optimization module is further used for:
updating the inertia weight of particles according to an inertia weight updating formula, wherein the inertia weight updating formula specifically is:

$$w=(w_{max}-w_{min})\exp(k-k_a)-w_{min}$$

wherein, w is the inertia weight, $w_{min}$ is an inertia weight minimum value, $w_{max}$ is an inertia weight maximum value, k is a slope average value of fitness values within the preset iteration times interval, and $k_a$ is a preset standard slope average value.

5. The energy-saving control system for a boiler in a thermal power plant according to claim 4, wherein the optimization module is further used for:
inputting an operating condition parameter combination of optimal boiler efficiency into the boiler operating efficiency prediction model, and determining the optimal boiler operating efficiency according to the boiler operating efficiency prediction model;
calculating a ratio between the current boiler operating efficiency and the optimal boiler operating efficiency, and calculating a difference value between an operating efficiency ratio and a preset allowable ratio;
if the difference value between the operating efficiency ratio and the preset allowable ratio is less than a first preset threshold, determining a first preset adjustment step size as an adjustment step size of the optimal operating condition parameter combination;
if the difference value between the operating efficiency ratio and the preset allowable ratio is greater than or equal to the first preset threshold, determining a second preset adjustment step size as an adjustment step size of the optimal operating condition parameter combination;
if the difference value between the operating efficiency ratio and the preset allowable ratio is greater than a second preset threshold, determining a third preset adjustment step size as an adjustment step size of the optimal operating condition parameter combination.

6. The energy-saving control system for a boiler in a thermal power plant according to claim 1, wherein the regulating and controlling module is further used for:
multiplying the correction value of the optimal operating condition parameter combination with each of parameters in the optimal operating condition parameter combination to obtain final operating condition parameters;
setting the adjustment step size of the optimal operating condition parameter combination as a current adjustment step size, and taking the final operating condition parameters as target values to adjust the current operating condition parameters of the boiler.

7. An energy-saving control method for a boiler in a thermal power plant, comprising:
obtaining operating condition parameters of a boiler in a thermal power plant and predicting current boiler operating efficiency according to the operating condition parameters of the boiler in the thermal power plant;
optimizing boiler input parameters based on a particle swarm algorithm, determining an optimal operating condition parameter combination according to optimization results, and setting adjustment steps of the optimal operating condition parameter combination according to operating efficiency predicted values;
obtaining NOx emission data of the boiler in thermal power plant and calculating a NOx emission fluctuation degree according to the NOx emission data;
setting an emission weight according to the fluctuation degree and setting a correction value of the optimal operating condition parameter combination according to the emission weight;
regulating and controlling the boiler of the thermal power plant according to the correction value of the optimal operating condition parameter combination;
wherein calculating a NOx emission fluctuation degree according to the NOx emission data comprises:
determining NOx emission concentration according to the NOx emission data of the boiler in thermal power plant, and drawing a NOx emission concentration change curve of according to a change trend of the NOx emission concentration with time;

creating a plurality of rolling time windows, setting window sizes of the rolling time windows according to a curve length of the NOx emission concentration change curve, and segmenting the NOx emission concentration change curve according to the rolling time windows;

calculating NOx emission concentration average values in segmented rolling time windows, and drawing a NOx emission concentration average value change curve according to a NOx emission concentration average value in each of the rolling time windows;

calculating a slope absolute value of two adjacent points in the NOx emission concentration average value change curve, and screening out data of slope absolute value with exceeding a first preset threshold; setting a proportion of a number of data of slope absolute value with exceeding a first preset threshold in the NOx emission concentration average value change curve as the NOx emission fluctuation degree;

wherein setting an emission weight according to the fluctuation degree and setting a correction value of the optimal operating condition parameter combination according to the emission weight comprise:

calculating a ratio of the NOx emission fluctuation degree to a preset allowable fluctuation degree, and normalizing the ratio of the NOx emission fluctuation degree to the preset allowable fluctuation degree;

setting a normalized ratio of the NOx emission fluctuation degree to the preset allowable fluctuation degree as an emission weight, and multiplying the emission weight with a preset standard correction value to obtain the correction value of the optimal operating condition parameter combination;

wherein setting an emission weight according to the fluctuation degree and setting a correction value of the optimal operating condition parameter combination according to the emission weight further comprise:

obtaining operating condition parameter in a preset period according to boiler historical operating data, and calculating a correlation coefficient between each of the operating condition parameters and the NOx emission concentration according to the operating condition parameters in the preset period;

taking the correlation coefficient between each of the operating condition parameters and the NOx emission concentration as an adjustment coefficient of each of the operating condition parameters, and adjusting a correction value of each of the operating condition parameters in the optimal operating condition parameter combination according to the adjustment coefficient of each of the operating condition parameters.

* * * * *